United States Patent [19]
Miaskoff

[11] 4,066,162
[45] Jan. 3, 1978

[54] ORBITAL TURN
[75] Inventor: Leonard Miaskoff, Easton, Pa.
[73] Assignee: Harris Corporation, Cleveland, Ohio
[21] Appl. No.: 635,942
[22] Filed: Nov. 28, 1975
[51] Int. Cl.² .................................................. B65G 47/24
[52] U.S. Cl. .................................. 198/377; 198/479; 198/696
[58] Field of Search ................ 198/25, 103, 210, 237, 198/241, 243, 377, 379, 479, 696; 214/1 BC

[56] References Cited
U.S. PATENT DOCUMENTS

| | | | |
|---|---|---|---|
| 2,510,568 | 6/1950 | Fouse | 198/210 X |
| 2,756,863 | 7/1956 | Laxo | 198/210 X |
| 3,175,704 | 3/1965 | McCreery | 198/210 X |
| 3,628,451 | 12/1971 | McClellan | 198/243 X |
| 3,765,545 | 10/1973 | Iwata | 214/1 BC |
| 3,812,949 | 5/1974 | Lush | 198/25 X |
| 3,837,471 | 9/1974 | Van der Schoot | 198/25 X |
| 3,868,009 | 2/1975 | Billi et al. | 198/25 |

FOREIGN PATENT DOCUMENTS

| | | | |
|---|---|---|---|
| 1,137,993 | 10/1962 | Germany | 198/243 |

Primary Examiner—John J. Love
Assistant Examiner—Richard Thomson

[57] ABSTRACT

A mechanism for transferring a book having a bound edge from one linear conveyor to another linear conveyor where the directions of movement of the conveyor intersect at an angle and where the article undergoes rotation during such transfer whereby the bound edge is reorientated so as to be leading on the second conveyor while not leading on the first conveyor.

1 Claim, 5 Drawing Figures

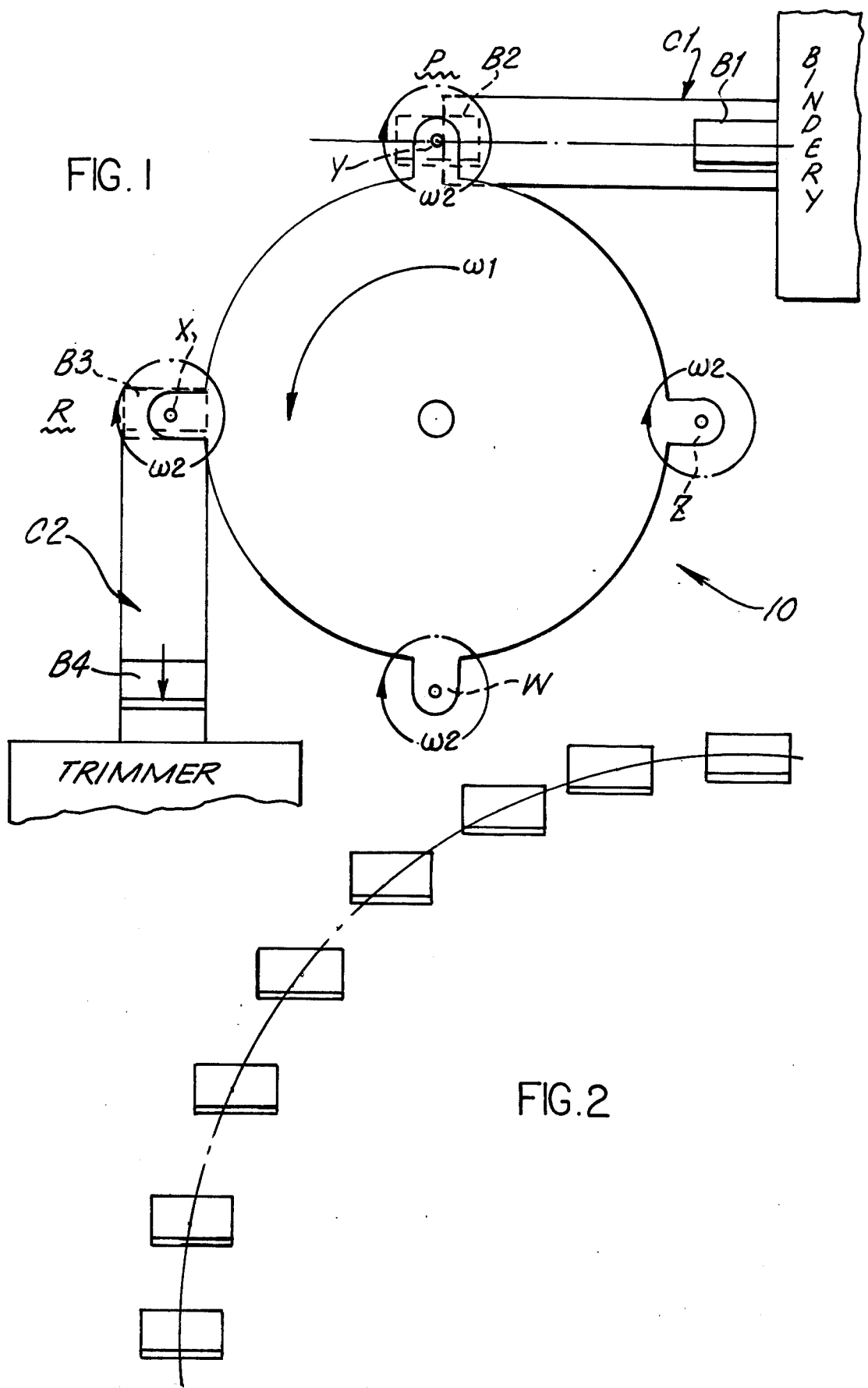

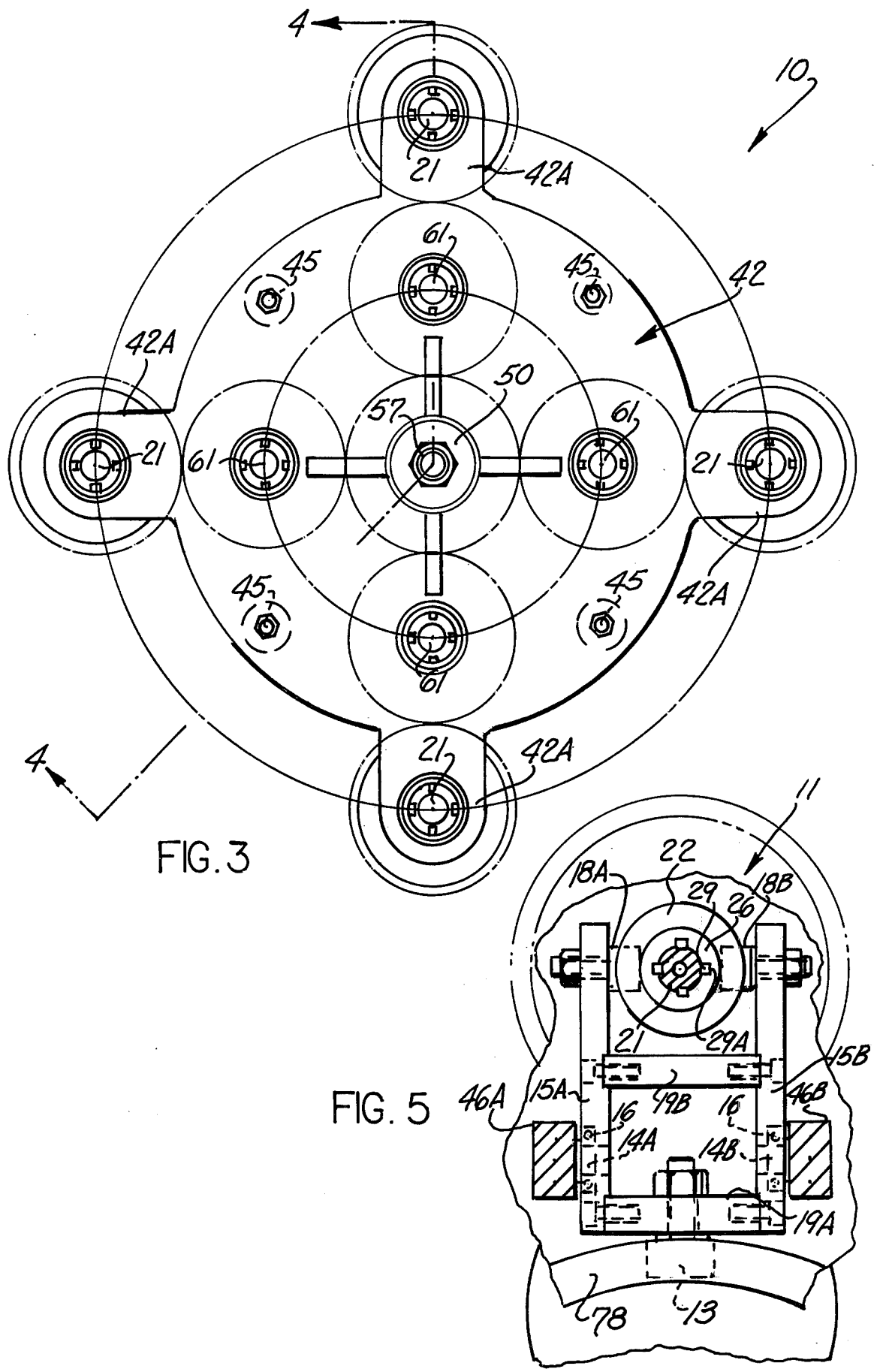

ORBITAL TURN

BACKGROUND OF THE INVENTION

The present invention is directed to an article handling mechanism.

In particular the present invention is designed for use in the conveying system of a book production line between two processing operations where both (1) the conveying system for the books changes direction and (2) the book must be properly oriented prior to it entering the second processing operation. Typical of these operations is the bindery operation and the trimmer where books are trimmed after being bound. Commonly, books leave the bindery with their bound edge on a side, but the books must enter the trimmer with their bound edge leading. Commonly, the books as they exit from the bindery are conveyed into a stop and are then moved perpendicular to their original direction of movement so that the bound edge now leads. As a result, the side edge (bound edge) which exits from the bindery becomes the lead edge as the book enters the trimmer, but the orientation of the book relative to ground has not changed.

Current problems encountered when the conveying system changes direction of the books center around the fact that the pages are ruffled, disarranged and damaged as the rapidly moving books collide with stationary stops or chutes.

Stops and chutes not only subject the books to rough handling, but such methods of guiding books may also disorientate the positions of the bindings. In a rapid, fully automated book assembly line, secure and precise handling is essential both to prevent damage to the pages and to properly orientate the bindings of the books between processing operations.

SUMMARY OF THE INVENTION

The present invention combines the operations of a secure, rapid exchange of books between conveyor belts and orientation of the book bindings between processing machines into a single mechanical action. The mechanism carries the books from one conveyor to a second conveyor which runs at an angle to the first conveyor, while simultaneously orienting the books so that the binding is on the proper side of the book for entry into the next processing operation.

For example, a partially processed book may leave the binding operation with the bound edge traveling parallel to the movement of the conveyor which conveys same. The next operation, the trimmer, may require the binding to be the leading edge. Commonly, the binder and trimmer are located, due to physical plant spacing optimization or maintenance accessibility, in positions which require the conveying means to complete an angle turn between the bindery and the trimmer machines. Use of a stop or chute to force the books to change direction between linear conveyor belts could result in scrambling of the book pages as the rapidly moving books struck the stop or chute at different angles. As mentioned previously, the stop may also result in ruffled or folded page edges, and also requires complete deceleration of the book and reacceleration after it engaged the stop.

The present invention functions both to rotate the book, to properly orientate the book binding and also to carry the books through a turn in the conveying system in a swift, secure manner, without the necessity of deceleration the book, and without the problems created by stops and chutes. The present invention clamps, carries, rotates and deposits the book on a conveyor. This process is accomplished by the present invention in three basic mechanical movements: (1) the vertical movement of grippers mounted on individual shafts for clamping and unclamping books: (2) the rotation of the individual shafts to rotate the grippers and books carried thereby for orientation of the books; and (3) the revolving of the grippers around a central shaft to turn the books.

The vertical movement of the grippers is imparted by lever assemblies mounted within the housing while the individual shafts, to which the grippers are splined are rotated by gears. Hence, the book is picked up from one conveyor by a vertical clamping action of a gripper secured to a sleeve on a shaft, turned on its own axis by the rotation of the individual shafts, and deposited on a second conveyor by the revolving of the disc housing and subsequent release of the clamping action. The movement resembles the rotating and revolving of satellites around a planet, thereby prompting calling the unit an "orbital turn".

The mechansim is powered by a single central shaft. The housing assembly which carries the individual clamping shafts, is comprised of two discs, the top one of which is mounted directly to the central shaft, and two parallel annuluses positioned in between the discs, all rotating around the central shaft and secured together by vertical positioning rods. Individual clamping shafts are symmetrically mounted in appendages of the disc housing. The top clamping shaft which drives the upper gripper is positioned by bearings in an appendages of the top disc of the disc housing while the lower disc of the disc housing carries the lower gripping component on a shaft which allows free rotation of the lower gripper component but restricts vertical movement.

The vertical clamping or gripping action of the top clamping shaft subassembly is actuated by a lever whose fulcum shaft is pivoted in arms suspended from a middle annulus of the disc housing. Vertical motion is imparted to the lever as it rotates with the housing by a stationary annular cam which drives one end of the lever downward, forcing the opposite end, which fits into a sleeve on the clamping shaft sleeve, to compress a spring and drive the clamping sleeve upward, thereby opening the gripping mechanism. As the lever travels, the stationary annular cam recedes and the lever releases the spring which thereby closes the gripping mechanism, to grip or clamp a book.

Rotation of the individual clamping shafts, which are mounted within bearings in the appendages of the top disc, is accomplished by means of a gear drive of three in-line successive gears, the outer most gear being mounted to the clamping shaft. As the disc housing rotates, the outer two gears mounted within the disc housing revolve around a stationary gear on the central housing, thereby imparting rotation to the outer two gears due to the meshing of the gear teeth and causing the upper clamping shaft to rotate in an angular direction opposite to the rotation of the central shaft. Concurrent rotation can be achieved by modifying gear placement as should be apparent to those skilled in the art. Modification of the extent and velocity of the clamping shaft can be achieved by varying the gear ratios between the stationary gear and the clamping shaft gear.

Throughout the preceding summary, the mechanical action of only one symmetrically positioned clamping shaft has been discussed. However, the description which follows also describes the remaining clamping shaft assemblies which act in seriatim as the disc housing rotates to carry the books from one conveyor to a second conveyor at an angle to the first conveyor in a continuous cycle.

The description of the preferred embodiment which follows is of a design where the book leaves one processing machine on a first conveyor with the binding located parallel to the movement of the first conveyor, and the book negotiates a right angle turn in the conveying system and must be orientated so that the binding becomes the leading edge as it is conveyed on a second conveyor. Thus, as the book is carried in a 90° arc between conveyors, the book must be orientated by a 90° turn of the book.

BRIEF DESCRIPTION OF THE DRAWINGS

FIG. 1 is a diagrammatic illustration of a device embodying the present invention showing one book being picked up as a second book is released;

FIG. 2 is a diagrammatic illustration of the sequential movement of the book and orientation of the book as it is being transferred between conveyors;

FIG. 3 is a horizontal plane view of an apparatus embodying the present invention;

FIG. 5 is an enlarged fragmentary sectional view, taken along the line 5—5 of FIG. 4, illustrating the construction of a lever assembly.

DESCRIPTION OF THE PREFERRED EMBODIMENT

Figure 4:
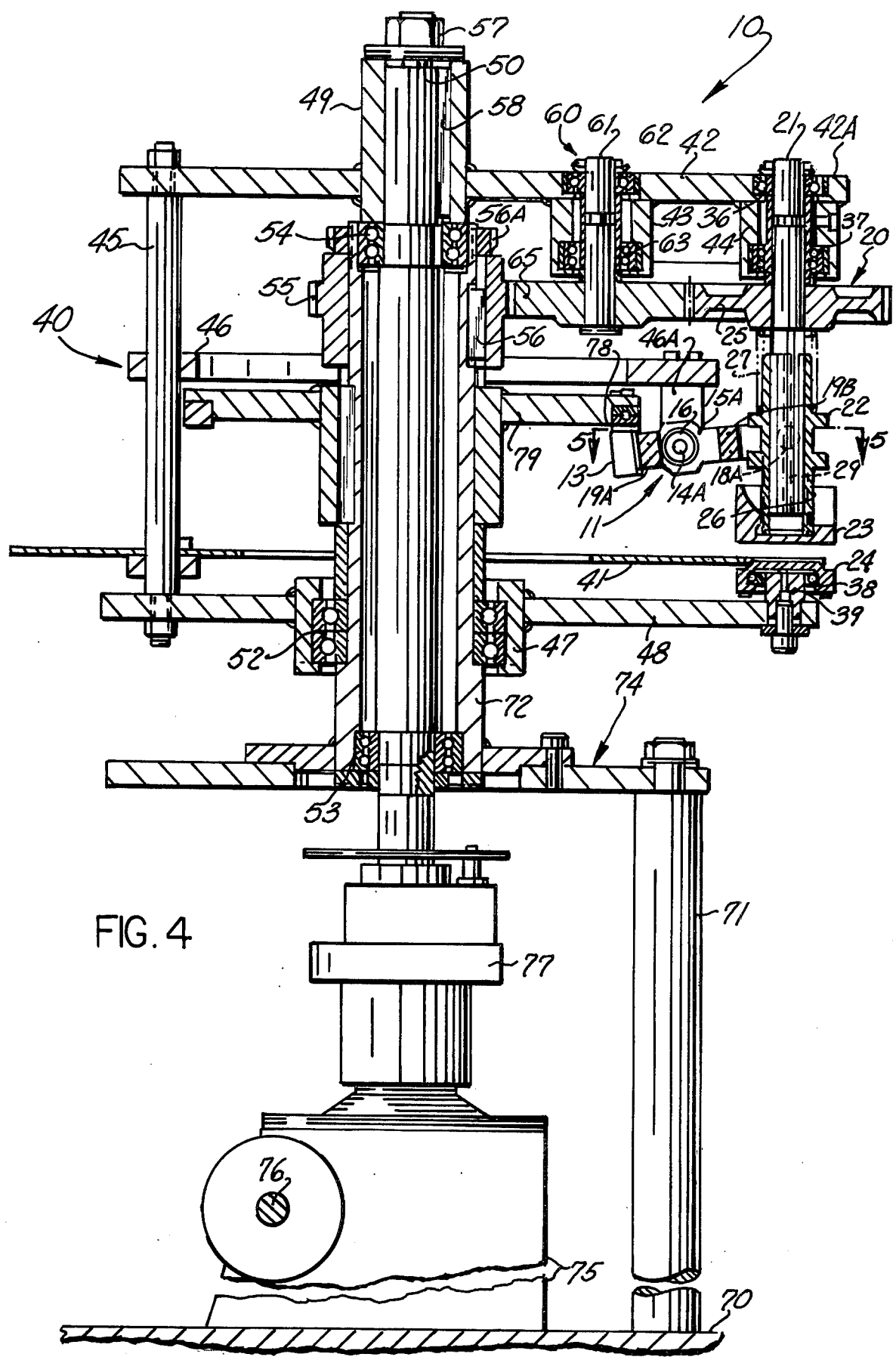
FIG. 4 is a cross sectional view of the apparatus of FIG. 3 taken on line 4—4 of FIG. 3.

An embodiment of the present invention is shown diagrammatically in FIG. 1 positioned between two conveyors $C_1$, $C_2$ in a book handling system. The apparatus 10 functions to transfer books from pickup point P on conveyor $C_1$ to release point R on the conveyor $C_2$, thereby changing the direction of book travel in a conveying system without accelerating or decelerating the books as is common with stops or chutes since the angular velocity of the apparatus is comparable to the speed of conveyors $C_1$, $C_2$.

The present invention as embodied in the apparatus sketched on FIG. 1 has four clamping subassemblies W, X, Y, Z acting in seriatim. While all four clamping subassemblies W, X, Y, Z continuously undergo rotating and clamping movements, only the clamping assembly within the arc P-R functions to carry a book at any given time. As each of the subassemblies travels through the arc, the books are transferred in a continuous sequence. For example, in FIG. 1, clamping assembly Y picks up book $B_2$ while clamping assembly X releases book $B_3$. After the orbital turn has completed a quarter turn, the book $B_1$ will have reached pickup point P, clamping assembly Z will clamp book $B_1$, and book $B_2$ will be released onto conveyor $C_2$ at point R.

As the books are carried through the arc P-R between conveyors $C_1$, $C_2$ at an angular velocity $\omega_1$ they simultaneously undergo a rotation $\omega_2$ about a point lying within the periphery of the book equal and opposite to $\omega_1$ such that the bindings, indicated by a double line, are re-orientated relative to the movement of the conveyors. In FIG. 1 the bindings on books $B_1$, $B_2$ leave the bindery with the bindings parallel to the movement of the conveyor $C_1$. After completion of the transfer, the bindings on books $B_3$, $B_4$ are the leading edge, extending perpendicular to the movement of the second conveyor $C_2$. The net effect of the simultaneous, equal and opposite rotations $\omega_1$, $\omega_2$, illustrated sequentially in FIG. 2, is that the bindings of the books remain continuously parallel to the bindings' original position on conveyor $C_1$.

The embodiments of the present invention are by no means limited to the angular rotations shown in FIGS. 1 and 2 as the embodiments maybe modified by those skilled in the art to adapt the apparatus to situations involving various turning and re-orientation angles. Having described the sequential movement and function of an embodiment of the present invention, the remaining illustrations and foregoing description offer a detailed explanation of the internal structure and mechanics of the apparatus.

FIG. 4 is an illustration of the supporting means and internal mechanics of an embodiment of the present invention taken from line 4—4 of the top horizontal plane view in FIG. 3. Conventional gearing means (not shown) within gear box 75 connects the input shaft 76 to the central shaft 50. A safety connection 77 is located adjacent gear box 75 on central shaft 50 to provide an alternate shearing point if shaft 50 should lock against rotation.

The substructure of the apparatus is comprised of base plate 70, two posts 71 and intermediate support plate 74. The base plate 70 supports both gear box 75 and posts 71 which in turn support the intermediate support plate 74. Mounted to the intermediate support plate 74 is cylindrical housing 72, which is the stationary support for the upper portion of the apparatus. The cylindrical housing 72 supports the central shaft 50 while allowing free rotation within bearings 53, 54.

The rotating components of the apparatus are mounted within the disc housing assembly 40 comprising an upper disc 42, lower disc 48, intermediate annulus 46, lower annulus 41, central shaft sleeve 49, lower bearing sleeve 47, intermediate shaft sleeves 43, clamping shaft sleeves 44, and rods 45. Upper disc 42, lower disc 48 and the two annuluses 46, 41 are positioned in parallel planes by rods 45. Due to the fact that the cross sectional view, taken along line 4—4 of FIG. 3, is not a single plane but two planes intersecting at a 135° angle, the clamping mechanism is shown on the right side of the illustration while the supporting posts 45 appear to the left, even though the upper portion of the apparatus is symmetrical about its central shaft.

The upper disc 42 functions to carry both the intermediate shaft 61 and clamping shaft 21 within sleeves 43, 44 respectively. FIG. 3, a horizontal plane view of the top of the apparatus, illustrates the symmetrical positioning of the intermediate shafts 61 located at right angles within the upper disc 42 while the clamping shafts 21 are positioned within the appendages 42A in the same manner. The lower disc 48 carries the lower clamping shafts 39 while the lower annulus 41 operates as a guide for books as they are positioned between grippers 23, 24. The intermediate annulus 46 supports the lever assembly 11, which will be described in detail hereafter.

The central shaft 50 supports and rotates the disc housing assembly 40 through central shaft sleeve 49 by means of key 58, and nut fastening means 57. The lower portion of the disc housing is supported radially by bearing 52 in sleeve 47.

To the right of the central shaft 50 as illustrated in FIG. 4 is one of the four intermediate shaft assemblies 60 comprising intermediate shaft 61, bearings 62, 63 and intermediate gear 65. Bearings 62, 63 position the shaft 61 within the sleeve 43 of the disc housing assembly 40 to allow free rotation of shaft 61 and intermediate gear 65, mounted thereto. As the disc housing assembly 40 rotates on shaft 50, intermediate gear 65 meshes with the stationary gear 55 mounted to the cylindrical housing 72, thus forcing intermediate gear 65 and shaft 61 to rotate in the same direction as the rotation of the disc housing assembly 40. The stationary gear 55 is locked against rotation by key 56 and secured to the cylindrical housing 72 by the retainer 56A.

To the extreme right of the apparatus as illustrated in FIG. 4 is one of the four clamping shaft assemblies 20. Each of the clamping shaft assemblies 20 comprises upper clamping shaft 21, upper clamping shaft bearings 36, 37, clamping shaft gear 25, sleeve 26, spring 27, collar 22, splines 29, recesses 29A, upper gripper 23, lower gripper 24, lower clamping shaft bearing 38 and lower clamping shaft 39. Mounted within the disc housing sleeve 44 are bearings 36, 37 which contain upper clamping shaft 21 and allow rotation of the upper portion of the clamping shaft assembly 20. Clamping shaft gear 25, mounted to the shaft 21 meshes with the intermediate gear 65 so that as gear 65 turns in the same direction as the disc housing assembly 40 as previously described, the clamping shaft gear 25 is driven in the opposite direction.

The angular velocity $\omega_2$ of the clamping shaft 21 is equal to the angular velocity $\omega_1$ of the central shaft 50 since the diamters of the stationary gear 55 and clamping shaft gear 25 are equal. Positioning an intermediate gear 65 between stationary gear 55 and clamping shaft gear 25 operates to change the direction of rotation. For example, assuming the central shaft 50 is turning counterclockwise, as the central shaft 50 rotates 90°, the intermediate gear 65 follows the stationary gear 55 along a quarter of its perimeter and is driven a corresponding amount in the counterclockwise direction. Regardless of the diameter of the intermediate gear 65 the distance traveled along the perimeter of the gears will be equal due to the meshing of gear teeth. Since the diameter of the clamping shaft gear 25 is equal to the diameter of the stationary gear 55, the clamping shaft gear 25 will rotate 90° in the clockwise direction.

The books, not shown in FIG. 4, are carried between the upper gripper 23 and lower gripper 24. The lower gripper 24 is mounted to the lower clamping shaft 39 which turns freely within bearing 38 while the upper gripper 23 is carried by sleeve 26 which is driven by the clamping shaft gear 25 as the splines 29 in the clamping shaft 21 mate with the corresponding recesses 29A in sleeve 26, as illustrated in FIG. 5. This splined mounting allows vertical movement of the sleeve 26 and upper gripper 23 as a book is clamped between the upper gripper 23 and lower gripper 24 due to the downward forced spring 27 or other biasing means.

The vertical lifting of the upper gripper 23 for gripping and releasing the books is accomplished by means of lever assembly 11, illustrated in FIG. 5. Each of the four lever assemblies are suspended below annulus 46 of the disc housing assembly 40 by mounting braces 46A, 46B. The lever assembly 11 comprises cam follower 13, pivot shafts 14A, 14B, lever arms 15A, 15B, bearings 16, rollers 18A, 18B and cross braces 19A, 19B. Lever arms 15A, 15B pivot by means of bearings 16 on shafts 14A, 14B mounted in braces 46A, 46B as illustrated in FIGS. 4 and 5. Cross braces 19A, 19B position lever arms 15A, 15B so that rollers 18A, 18B embrace the collar 22 on clamping shaft sleeve 26 in a secure manner without interfering with its rotation. As disc housing 40 revolves, cam follower 13 rides the stationary annular cam 78 on disc 79 which is mounted on the cylindrical housing 72. Rises not shown, in annular cam 78 located at intervals corresponding to the pickup and release points force the cam follower 13 downward thereby causing rollers 18A, 18B at the opposite end of lever assembly 11 to lift collar 22, sleeve 26 and upper gripper 23. Assuming the clamping shaft assembly is at the pickup point P as illustrated in FIG. 1, a book leaving conveyor $C_1$ is channeled between grippers 23, 24 (not shown in FIG. 1) for clamping. As the disc housing 40 rotates at a velocity corresponding to the velocity of conveyor belt $C_1$ so that the book is neither accelerated or decelerated, cam follower 13 leaves the rise in annular cam 78 and spring 27 forces the upper gripper 23 downward, thereby clamping the book. As the disc housing assembly 40 continues to travel in the arc P-R, as shown in FIG. 1, the clamping shaft 21 rotates in a direction opposite to the rotation of the disc housing assembly 40 so that the book is rotated in the manner illustrated in FIG. 2 as previously described. When the release point R is reached, a corresponding rise in annular cam 78 forces cam follower 13 downward which results in the raising of upper gripper 23 and the release of the book onto conveyor $C_2$ which its binding properly oriented.

Although this invention has been described with a certain degree of particularlity, it is to be understood that the preceding description has been made only as an example and that numerous changes in the details of the elements and assemblies may be resorted to without departing from the spirit and scope of this invention as set forth in the following claims.

What is claimed is:

1. Apparatus for transferring a book having edges formed by the edges of the pages of the book and extending between first and second spaced substantially parallel side surfaces and at least one of the edges being bound, said apparatus being effective to transfer a book from a first conveyor on which the book is moved at a first speed with a first edge leading and the first side surface facing up and the second side surface facing down and in contact with the first conveyor to a second conveyor on which the book is moved at a speed substantially equal to said first speed of said first conveyor with another edge leading and the first side surface facing up and the second side surface facing down and in contact with the second conveyor, said apparatus comprising first and second clamps for respectively engaging the first upwardly facing side surface and the second downwardly facing side surface of the book, means for moving said first and second clamps into a position in alignment with said respective first and second side surfaces of the book while the book is moving and while the first edge thereof is leading, means for guiding books between said clamps, means for actuating said clamps to clamp the book while the book is moving and while the first leading edge of the book is spaced from engagement with any structure by moving at least one of said first and second clamps into clamping engagement with one of said parallel side surfaces while the other clamp engages the other of said parallel side surfaces, said first and second clamps having substantially flat surfaces parallel to said first and second conveyors and being positioned by said means for moving said clamps into alignment with said side surfaces of the book to engage said second side surface facing down which contacted said first conveyor and said first side surface facing up, means for continuously moving said first and second clamps and book clamped therebetween at a speed substantially equal to the speed of said first and second conveyors from a position adjacent to said first conveyor to a position adjacent to said second conveyor in a continuous fashion at a constant speed without accelerating or decelerating the book, said means for continuously moving said first and second clamps and book while clamped therebetween to a position adjacent said second conveyor comprising means for rotating said clamps together about a second common axis parallel to a first common axis which extends transverse to said first and second parallel side surfaces and wherein said means comprises a pair of vertically spaced parallel supports associated together for a joint rotation about said second common axis and wherein said one clamp is carried by one of said supports and said other clamp is carried by the other of said supports, said other clamp being supported by said other support by a bearing means enabling said clamp to be rotated freely relative to said other support about an axis centrally located relative to said other clamp and which axis comprises said first common axis, said guide being interposed between said first and second supports and extending parallel thereto for guiding a book between said clamps, means for releasing the book for deposit on said second conveyor when the book is positioned adjacent thereto and while the book and said clamps are moving, said means for releasing adapted to oppositely move the flat parallel surfaces of said clamps to release and align the book on said second conveyor with another edge leading and the second side surface facing down and in contact with the second conveyor, means for supporting said first and second clamps for rotation about said first common axis, and means for continuously rotating said first and second clamps about said first common axis while said book is clamped therebetween to effect a continuous rotation of said book continuously and simultaneously while being moved between said first and second conveyors to orient the book with the second edge thereof leading when conveyed on said second conveyor, said means for rotating said first and second clamps about said first common axis comprises means for rotating said first clamp about said second common axis while rotating about said first common axis with a book between said clamps whereby said second clamp is likewise rotated about said second common axis, said means for continuously rotating said first clamp about said first common axis upon rotation of said clamps around said second common axis comprises a series of gear members one of which is mounted on said first common axis and has its axis coaxial with said first common axis and another of which is mounted on said second common axis and which is driven from said first gear member upon rotation of said second gear member about said second common axis, said series of gear members comprises first, second and third gear members meshing in succession, the first gear member meshing with said second gear member and said second gear member meshing with said third gear member, said first gear member being fixedly mounted against rotation and located coaxially with said second common axis, said second gear member being mounted for rotation on said first support such that as said first support is rotated about said second common axis said second gear member is driven around the first gear member, said third gear member being mounted coaxially with said first common axis, and means connecting said one clamp member to said third gear member for rotation therewith about said first common axis.

* * * * *